Patented Oct. 20, 1953

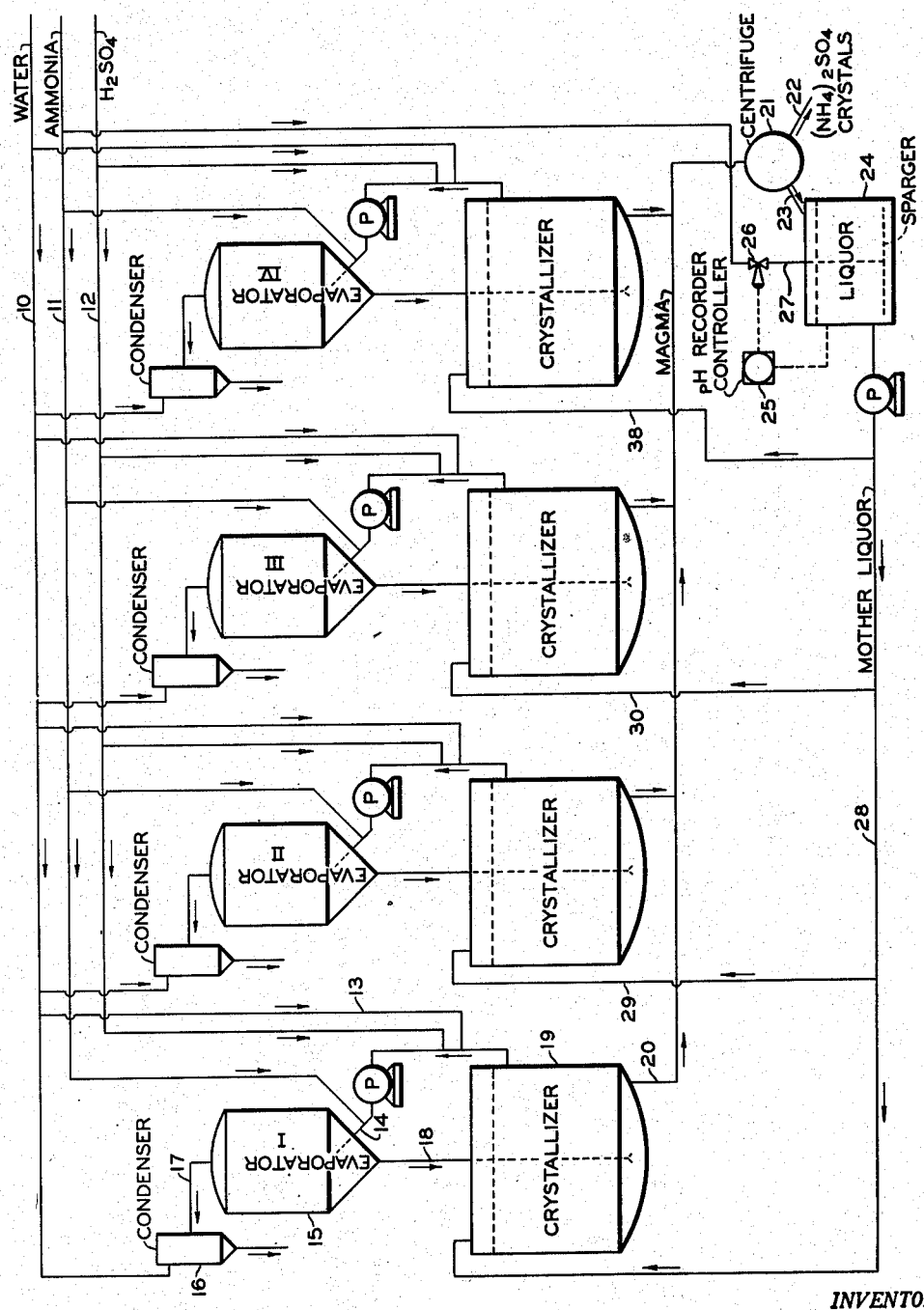

2,656,248

UNITED STATES PATENT OFFICE 2,656,248

AMMONIUM SULFATE PRODUCTION

Russell K. Simms, Bartlesville, Okla., assignor to Phillips Petroleum Company, a corporation of Delaware Application October 21, 1949, Serial No. 122,754

4 Claims. (Cl. 23—119)

This invention relates to the manufacture of ammonium sulfate. In one of its more specific aspects it relates to the manufacture of improved ammonium sulfate crystals. One embodiment of this invention relates to an improved process for operating two or more evaporative crystallizers for the production of ammonium sulfate crystals utilizing a single separation means.

There are many processes for the manufacture of ammonium sulfate, most of which are variations of two particular processes. The first of these is the direct reaction of ammonia or an ammonia-containing gas with sulfuric acid or solutions containing same, thereby giving ammonium sulfate as product; and the second is the gypsum process wherein calcium sulfate is reacted with ammonium carbonate to give a product of ammonium sulfate and a by-product of calcium carbonate. In either of these, the ammonium sulfate product is recovered as an aqueous solution and must be concentrated and evaporated to produce crystalline ammonium sulfate.

It is well known that ammonium sulfate crystallizes in several forms, some of which are much more advantageous than others. For example, it is known that use of considerable turbulence during the crystallization of ammonium sulfate provides long needle-like crystals which have a tendency to cake and bridge on storage. This type of crystal may also be produced when the mother liquor, that is, an aqueous solution of ammonium sulfate, is too acid. It is also known that fragile and soft crystals of ammonium sulfate are usually produced when the mother liquor solution from which the ammonium sulfate is being crystallized contains an excess of ammonia. The most advantageous type of crystals which may be produced by controlled crystallization are those of a rhombic character which have a relatively high bulk density and which generally do not cake and bridge on storage nearly as much as the above described needle-like crystals or as plate-like crystals.

It is an object of this invention to provide a process for the production of ammonium sulfate crystals of a particularly desirable size and shape.

Another object is the production of ammonium sulfate crystals of high bulk density.

Another object of this invention is to provide a process whereby two or more evaporative crystallizers utilizing the same crystal separation means may be operated in conjunction with one another.

Still another object of this invention is to provide a process for counteracting the tendency of an ammonium sulfate liquor to become excessively acid during a process of crystallization.

Another object is to provide a process for the manufacture of crystalline ammonium sulfate by reaction of ammonia gas with sulfuric acid wherein a plurality of evaporative crystallizers are operated smoothly and without bumping and hammering caused by too great pH changes.

Other objects and advantages of this invention will be apparent to one skilled in the art from the accompanying disclosure and discussion.

I have discovered an improved method for operating a plurality of ammonium sulfate crystallization units so that the pH of the liquor to be crystallized in each unit is maintained within an optimum range so as to produce a crystal size in the range of 20 to 60 mesh. I have further discovered that by such control the shape and character of ammonium sulfate crystals produced is such that their bulk density is high and yet they do not bridge and cake on storage.

I have found that it is almost impossible to regulate the pH of a plurality of crystallizers so that it remains the same for each crystallizer. In the pH ranges dealt with in the manufacture of ammonium sulfate, it has been found difficult to control accurately and minutely an evaporative crystallizer utilizing a conventional pH recorder and controller. The most desirable range of acidity used when producing ammonium sulfate crystals by evaporation is within the range of 0.2 to 0.5 mol per cent excess acid which corresponds to a pH range of about 2.5 to 1.5. However, broadly, a range of 0 to 1 mol per cent excess acid based on ammonia may be satisfactory. I have observed that when a group of crystallizers is operated together the optimum pH for one may be slightly different than that for another or that one may be controlled smoothly at one pH while another one may be controlled smoothly at a slightly different pH. Further, I have found that operating in this particularly low range of pH it is difficult to control the pH within a narrow range, and for this reason the excess acid content of one crystallizer may vary within a range of from, say, almost 0 to 1 mol per cent, or even higher at times. I have also found that the pH of the returned mother liquor recovered after separating crystals therefrom will have considerable effect on the smooth operation of a crystallizer. For example, if a crystallizer is operating smoothly at an excess acid content of 0.3 mol per cent, the controlling device will become unbalanced if a mother liquor of a free acid content of, say, 1 mol per cent is introduced thereto. That has actually happened in commercial operation and a solution for this problem is the basis for this invention. It is of course obvious that when more than one evaporative crystallizer is operating at a high acid level the effect on the acidity of the combined mother liquor will be cumulative and will require an even longer time to correct.

It is particularly disastrous when the pH of the mother liquor changes quite rapidly such as might be caused by clogging of the acid or ammonia inlets to one of the evaporative crystallizers. When such a breakdown does occur, the use of a pH controller on the mother liquor is doubly advantageous since it prevents the pH of the remaining crystallizers from being thrown completely off.

Since the optimum free acid range for producing ammonium sulfate crystals of desired size, shape, and character is in the range of 0.2 to 0.5 mol per cent, I have found that utilization of a pH recorder controller on the mother liquor returned from separating apparatus such as a centrifuge or the like, wherein crystals have been separated from mother liquor, provides optimum control of the mother liquor within this range of acidity. For example, when utilizing three evaporative crystallizers the magmas of which are separated in a single centrifuge, the acidity of the separated mother liquor may be considerably higher than that desired for one or two of the units. By controlling this with a pH recorder controller which will cause to be introduced to this mother liquor a quantity of ammonia such that the acidity is reduced to within the desired and optimum range of 0.2 to 0.5 mol per cent free acid, the pH within the various crystallizers will be more easily controlled to within this range also.

It has been found that in changing the free acidity of the liquor in an evaporative crystallizer the maximum amount of change which it is desirable to make, as might be required when the pH has changed undesirably due to over acidity of the recycle mother liquor, is 0.1 per cent in fifteen minutes. It is more desirable from the standpoint of smooth operation to make a change such as this over a period of about one-half to one hour. Because of the considerable time required to correct pH variations it is apparent that the more accurate the control the better. At times it is necessary to redissolve crystals made when the mother liquor pH was not right because of their poor shape or other adverse characteristics.

In a second embodiment of my invention I may utilize an individual pH recorder and controller on each mother liquor return line to each of the evaporative crystallizers rather than on the composite mother liquor recovered from the centrifuge. In this manner, the acid content of the ammonium sulfate mother liquor being returned to each crystallizer may be controlled in such a manner that it will conform to the particular crystallizer thus preventing unbalancing of the main pH recorder controller for that crystallizer. Also with such an arrangement the pH of a crystallizer which has gone beyond that desired may be more rapidly returned to within the optimum range. In addition, when it has been found that the crystallizers operate more smoothly at slightly different pH's the pH for the mother liquor returned to each may be so controlled as to provide that which is most desirable for the particular unit.

The following discussion of the drawing will disclose in more detail one form of apparatus in which my invention may be practiced, and will give a more clear understanding of the many aspects thereof.

Refer now to the attached figure, the discussion of which will serve to exemplify my invention. This figure shows a battery of four evaporative crystallizers of a modified Oslo-type piped as they normally are for commercial use. Water is passed to each of these crystallizers from line 10 which acts as a manifold. Ammonia and sulfuric acid are passed through lines 11 and 12, respective, in a similar manner. (It is within the scope of my invention that a solution of ammonium sulfate be introduced to the crystallizers which has been obtained from an outside source, rather than producing same within the apparatus by the reaction of ammonia and sulfuric acid.) Following lines 11 and 12, it will be noted that they lead to the return line from the crystallization zone of evaporator 1. It will also be noted that water is introduced to this same line via line 13. These constituents are admixed in return line 14, the acid reacting with the ammonia to produce ammonium sulfate, and the water merely being used as a means of heat removal by its evaporation. The ammonium sulfate liquor which passes from line 14 into evaporator 15 is evaporated by pulling a vacuum on the evaporator by means of condenser 16. Process water from line 10 passes through condenser 16 thereby condensing vapor passing from evaporator 15 through line 17. A steam ejector, not shown, is also attached to this line to remove uncondensable gases so that the vacuum may be maintained. Thus, the ammonium sulfate liquor becomes concentrated to such an extent that its supersaturation passes into the metastable region. The evaporated and supersaturated liquor from evaporator 15 passes downward therefrom through line 18 into crystallizer 19 where the crystals therein grow by contacting the supersaturated liquor until they are of the desired size. The process flow is so controlled that when crystals become of a desired size (i. e., in the range of 20 to 60 mesh, their weight causes them to settle through the liquor within the crystallization zone so that they will be withdrawn from the bottom of the crystallizer as through line 20 in the form of a magma, which is a slurry of crystals and ammonium sulfate mother liquor. This magma along with that withdrawn from similar units II, III, and IV is passed to a suitable separation means such as centrifuge 21. In this unit the crystals are separated from the mother liquor and are washed to remove any trace of acid thereon. Thus, optimum crystals are recovered via line 22 and may be passed to rotary kilns or other suitable drying apparatus or recovery means. Separated mother liquor is passed via line 23 to mother liquor storage tank 24. The pH of the liquor in this tank is recorded by recorder controller 25 which controls motor valve 26 on ammonia inlet line 27. In this manner when the acid content of the liquor becomes too high the recorder controller opens valve 26 allowing a quantity of ammonia to be introduced to the liquor thus reacting with some of the excess acid to produce additional ammonium sulfate. In addition, the controller may also be used to control the introduction of acid. Mother liquor thus treated is then returned via line 28 to evaporative crystallizer I and from line 28 through lines 29, 30, and 38 to units II, III, and IV, respectively. Thus, it will be seen that a very adequate control may be used to supplement recording and controlling apparatus utilized in governing the pH of the individual evaporative crystallization apparatuses.

Although this process has been described and exemplified in terms of its preferred modifications, it is understood that various changes may be made without departing from the spirit and scope of the disclosure and of the claims.

I claim:

1. A process for the manufacture of crystalline ammonium sulfate in a plurality of crystallization units wherein the free acid of the liquor is at variance from unit to unit and is to be maintained within an optimum range which process comprises arranging the several crystallization units for parallel operation so that when water, ammonia and sulfuric acid are introduced to said units the free acid content in each unit is approximately the same and within the range of 0.2 to 0.5 mol per cent excess based on ammonia, withdrawing and admixing the magma from crystal formation in the several crystallization units when the crystals have reached a size in the range of 20 to 60 mesh and passing the resulting admixture to a separation zone, separately recovering ammonium sulfate crystals and mother liquor in said separation zone, to assist in keeping the free acid content in each crystallizer within the range of 0.2 to 0.5 mol per cent adjusting said free acid content of recovered mother liquor to within said range, and recycling the thus treated mother liquor to the various evaporative crystallization units.

2. The process of claim 1 in which the pH of the recycled mother liquor to each of the several crystallization zones is separately controlled so as to provide individual control of the pH of the liquor in each of said zones.

3. A method of operating a series of evaporative crystallization zones in the production of relatively large and uniform ammonium sulfate crystals, which comprises passing water, ammonia, and sulfuric acid into each of said zones in such proportions as to maintain therein a pH in a range corresponding to 0.2 to 0.5 mol per cent free acid (based on ammonia) and form ammonium sulfate crystals therein of a size in the range of 20 to 60 mesh; withdrawing magma from the several crystallization zones when the crystal size has reached said range and separately recovering ammonium sulfate crystals and motor liquor therefrom; recycling mother liquor to each of said zones; and as the pH of the liquor in any one of said crystallization zones varies from an optimum pH in said range, separately regulating the pH of the recycled stream to that zone so as to gradually adjust the pH of the liquor to said optimum pH in the zone of variance.

4. The process of claim 3 in which restoration of optimum pH in any zone is limited to a maximum rate of change of 0.1 per cent in 15 minutes.

RUSSELL K. SIMMS.

References Cited in the file of this patent
UNITED STATES PATENTS

| Number | Name | Date |
|---|---|---|
| 1,917,915 | Atwater | July 11, 1933 |
| 2,409,790 | Otto | Oct. 22, 1946 |
| 2,424,207 | Otto | July 15, 1947 |